(No Model.)

H. VICKERY.
GUANO DISTRIBUTER AND SEED PLANTER.

No. 465,149. Patented Dec. 15, 1891.

WITNESSES:
Fred G. Dieterich
M. D. Blondel

INVENTOR:
Hesekiah Vickery
BY Munn & Co
ATTORNEYS

UNITED STATES PATENT OFFICE.

HEZEKIAH VICKERY, OF WILLACOOCHEE, GEORGIA.

GUANO-DISTRIBUTER AND SEED-PLANTER.

SPECIFICATION forming part of Letters Patent No. 465,149, dated December 15, 1891.

Application filed March 2, 1891. Serial No. 383,500. (No model.)

*To all whom it may concern:*

Be it known that I, HEZEKIAH VICKERY, of Willacoochee, in the county of Coffee and State of Georgia, have invented a new and useful Improvement in Guano-Distributers and Seed-Planters, of which the following is a specification.

This invention relates generally to agricultural implements, and particularly to a combined fertilizer-distributer and corn and cotton planter.

The object of my invention is to construct an agricultural implement of the character described that shall be simple, durable, and efficient, and one which can be quickly and easily changed from one implement to another.

With these objects in view my invention consists in the peculiar construction of the several elements and their novel combination or arrangement, all of which will be more fully hereinafter described, and pointed out in the claim.

Figure 1:
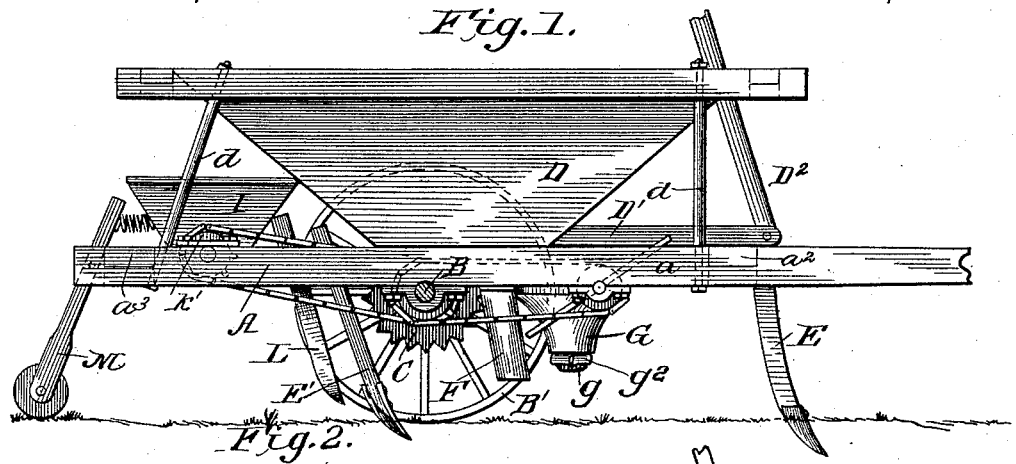
Figure 2:
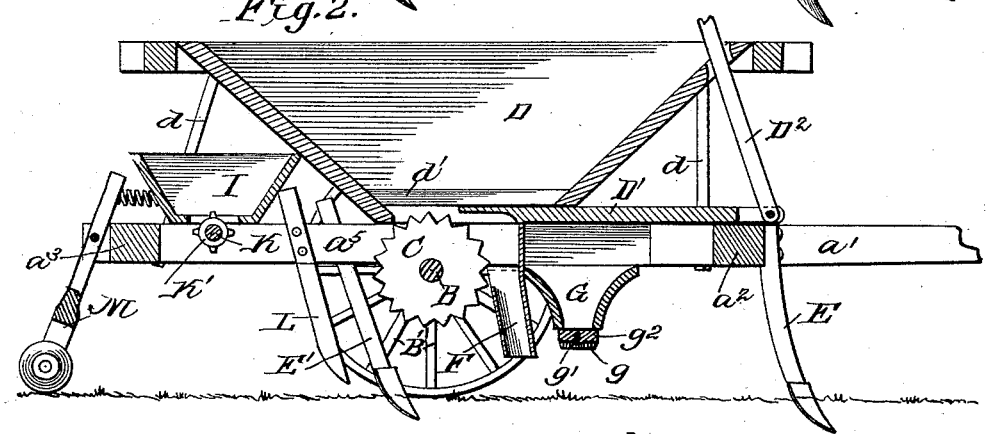
Figure 3:
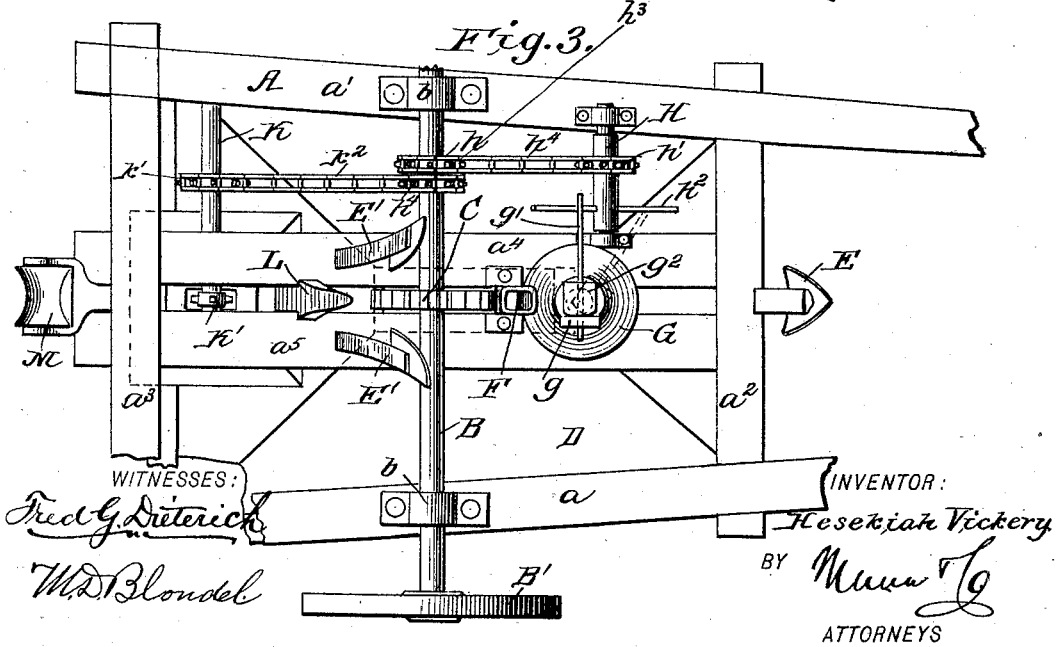

In the drawings forming a part of this specification, Figure 1 is a side view of my improved distributer. Fig. 2 is a central vertical longitudinal section, and Fig. 3 is a bottom plan view.

In carrying out my invention I employ a main frame A, essentially rectangular in shape, said frame being composed of the side beams $a\,a'$ and the front and rear beams $a^2$ and $a^3$, respectively. Central longitudinal beams $a^4$ and $a^5$ are secured at their ends to the front and rear cross-beams, said central beams having a narrow space between them, the purpose of which will appear hereinafter. An axle B extends across the bottom of the main frame, said axle being journaled in boxes $b\,b$, arranged upon the lower faces of the side beams $a$ and $a'$. Drive-wheels B' are mounted upon the ends of the axle, and at the center of the axle and between the central beams is secured a stirrer-wheel C. A bottomless hopper D, constructed with downwardly-tapering sides, rests upon the central beams, said hopper being supported in such position by means of the brace-rods $d$, attached to each end of the hopper and bearing on the adjacent end of the main frame. The stirrer-wheel C projects a short distance into the hopper for the purpose of stirring the contents and maintaining an even flow of the same. The front side of the hopper is cut away at its lower end to permit the insertion of a slide D', which acts as a bottom or cut-off to prevent the discharge of the fertilizer. Guide-strips $d'$ are secured near the lower ends of the sides of the hopper, said strips forming a guideway in which the cut-off slide works, the inner or rear end of said slide having its under surface cut away in order to slide freely over the stirrer-wheel. A hand-lever $D^2$ is pivoted to the front side of the hopper, the lower end of said lever being pivotally connected with the forward end of the cut-off slide, whereby by operating the hand-lever the slide can be worked in or out, as desired. A furrow-opening plow E is secured to the center of the front cross-beam $a^2$, and to the rear of the stirrer-wheel ridger-plows E' E' are secured to the central beams, said plows being adapted to form a ridge after the fertilizer has been distributed. If desired, a feed-chute F may be employed to conduct the fertilizer to the ground, thereby preventing scattering by the wind. As it is also my intention to plant corn with my combined implement, I arrange a corn-hopper G upon the under sides of the central beams forward of the fertilizer-hopper, one side of said hopper having a downwardly-projecting lug $g$, which is perforated to receive a spring-rod $g'$, said rod having a disk $g^2$ secured thereto, which forms the bottom of the corn-hopper. A transverse shaft H is journaled between the beams $a^4$ and $a'$ opposite the corn-hopper, said shaft having a pulley $h'$ mounted thereon, and the shaft also carries an arm or rod $h^2$, which when the shaft is revolved engages the spring-rod $g'$, forcing it to one side and moving the disk $g^2$ to one side, whereby a definite quantity of grain is deposited, and as soon as the arm $h^2$ is disengaged from the spring-rod the disk is brought back beneath the hopper and the flow of grain cut off. The main shaft or axle is also provided with a pulley $h^3$, from which motion is communicated to the pulley $h'$ by means of a belt or chain $h^4$. The cotton-seed hopper I is arranged at the rear end of the frame upon the upper faces of the central beams, said hopper having a slotted bottom resting over the space between the central beams. A rear transverse shaft K is journaled between the beams $a'$ and $a^4$ opposite the cotton-seed hopper, and upon the inner end of said shaft is mounted a feed-wheel K', which turns in the slot in the bottom. The shaft K is also provided with a pulley $k'$, which receives motion from the pulley $h^4$ by means of the belt or chain $k^2$. A furrow-opening plow L is arranged between central beams to the rear of the ridger-plows E' and in advance of the cotton-seed hopper. A covering roller M is attached to the rear cross-beam $a^3$, by means of which the seed are covered, the said roller being spring-actuated, whereby it is capable of passing over rocks, stumps, and the like, without danger of being damaged. The fertilizer and cotton planters are adapted to be used together, and it will be seen that when so used the furrow-opening plow at the front will open up the ground, and in said furrow is deposited the fertilizer and the ridger-plows fill in the furrow and form a ridge. This ridge is opened by the opener L and the cotton-seed are deposited and covered by the coverer.

Having thus described my invention, what I claim as new is—

The combination, with the central beams, of the corn-hopper G, secured thereto, an apertured lug formed upon the lower end of said hopper, a spring-rod arranged in said apertured lug, a disk mounted upon said rod and adapted to form the bottom of said hopper, a revoluble transverse shaft, and an arm secured thereon adapted to intermittently engage the spring-rod, substantially as shown and described.

HEZEKIAH × VICKERY.
his mark

Witnesses:
N. M. PAFFORD,
J. Q. HAMMOND.